Patented Nov. 12, 1929

1,735,701

UNITED STATES PATENT OFFICE

GEORGE STAFFORD WHITBY, OF MONTREAL, QUEBEC, CANADA, ASSIGNOR TO THE ROESSLER & HASSLACHER CHEMICAL COMPANY, OF NEW YORK, N. Y., A CORPORATION OF NEW YORK

ACCELERATOR FOR THE VULCANIZATION OF RUBBER

No Drawing.    Application filed May 17, 1928. Serial No. 278,638.

The object of this invention is to provide a new and desirable accelerator for the vulcanization of rubber, which will produce rapid vulcanization and give the finished rubber product excellent physical properties such as desirable stress strain relationship, high tensile strength and related properties.

This invention relates specifically to the use of secondary alkyl monoxanthogens. These are new organic compounds of the general formula

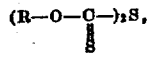

wherein R—O— is a secondary aliphatic alcohol radical, and belong to the class of compounds which may be called "oxy alkyl thiocarbonic monosulphides". They are formed by the elimination of an atom of sulphur from the corresponding dixanthogens i. e. the corresponding oxy alkyl thiocarbonic disulphides, for example, by means of an alkali metal cyanide, as described and claimed in my copending application filed of even date herewith. In order to illustrate the preparation of the materials of my invention, my preferred compound isopropyl monoxanthogen or oxy isopropyl thiocarbonic mono sulphide, to which I ascribe the formula

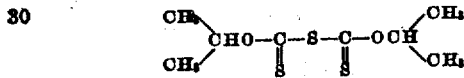

is prepared as follows:

67.5 grams of isopropyl dixanthogen melting at 57° to 58° C. were dissolved in 250 cc. of acetone. A solution of 13 grams of egg sodium cyanide (96 to 98% NaCN) in 25 cc. of water was gradually added with agitation of the mixture over a period of 40 minutes. The temperature of the mixture was kept below 8° C. for 1½ hours after adding all the cyanide and while stirring. Finally, the reaction was stirred for 1½ hours at about 16° C. and then filtered. The cake, after washing out with water to remove practically all sulfocyanides was dried and amounted to 38 grams of monoxanthogen melting at 49–54° C. The recrystallized and purified isopropyl monoxanthogen is in the form of yellow crystals melting at about 55° C. The filtrate of 270 cc. was treated with water, cooled, filtered, and the residue washed with water and dried in the air. The additional monoxanthogen thus obtained amounted to 21.2 grams melting at 38–41° C. The filtrate and wash waters were combined, diluted to 1 liter, and analyzed for sodium cyanide and sulfocyanide. Total weight of crude isopropyl monoxanthogen crystals; 59.2 grams or 99.5% yield. Sodium cyanide remaining; 0.05 grams. Total sodium sulfocyanide produced; 19.28 grams. (93% yield). This process may be varied by diluting the whole of the reaction liquid with water upon completion of the reaction and then filtering to separate all of the crude monoxanthogen at once. Cooling the reaction liquid also aids in precipitating the product. Alcohol may be used as a solvent instead of acetone.

I have investigated several substances apparently containing the grouping,

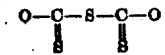

and derived from primary alcohols, and have found that this class is in general unsatisfactory for use as accelerators; and that the results are of no practical value even with amines, which are activators for this type of sulfide accelerator.

I have found the same to be true of members of this type of compound derived from secondary aromatic alcohols, such for example as methyl alcohol and the like. Some of the primary alcohol derivatives which I have tested are the ethyl, n-propyl, n-butyl, isobutyl, and isoamyl derivatives.

On the other hand, I have found that a secondary aliphatic alcohol derivative, such as isopropyl monoxanthogen, accelerates the vulcanization of rubber when incorporated into a rubber mix with a vulcanizing agent, such as sulphur, with or without amines, and the vulcanized product possesses high tensile strength and other desirable properties. Isopropyl monoxanthogen produces an especially good rubber product under a variety of vulcanization conditions. It can be used, for example, in low or high zinc stocks and in the presence or absence of an amine, with exceptionally good results. It can also be used along with the common rubber conditioning agents, anti-oxidants, rubber substitutes, reclaims, etc., or in combination with other accelerators. It possesses the desirable property of being a solid at ordinary temperatures and still of sufficiently low melting point to allow of easy incorporation with the rubber batch. Being a derivative of isopropyl alcohol, which is a relatively common and inexpensive alcohol, its preparation cheaply and in large quantities is commercially practicable.

The following examples will illustrate my invention:

*Example I*

Isopropyl monoxanthogen was used in the formula:

100 parts by weight rubber
5 parts by weight zinc oxide
5 parts by weight sulphur
1 part by weight accelerator This mixture was milled and then cured for various periods at the temperature of 10 pound steam. The resulting vulcanized rubber had the following properties:

| Time of cure | Stretch | Set | Load at 600% elong. | Tensile |
|---|---|---|---|---|
| 15 min. | 752% | 13 | 2400 lbs./in². | 5180 lbs./in². |
| 30 min. | 800% | 24 | 2100 lbs. | 4899 lbs./in². |
| 60 min. | 785% | 21 | 1000 lbs. | 4671 lbs./in². |

In contrast to this test, a similar test using the corresponding normal alcohol derivatives, n-propyl monoxanthogen, as the accelerator and the formula:

100 parts by weight rubber
5 parts by weight zinc oxide
5 parts by weight sulphur
2 parts by weight accelerator gave the following results for the vulcanized rubber:

| Time of cure | Temperature | Results |
|---|---|---|
| 60 min. | 10 lbs. of steam | No vulcanization. |
| 60 min. | 40 lbs. of steam | Too weak to test. |

*Example II*

Isopropyl monoxanthogen was used in a high zinc stock, as follows:

100 parts by weight rubber
100 parts by weight zinc oxide
5 parts by weight sulphur
1 part by weight accelerator After milling and then curing for various periods at the temperature of 10 pound steam a vulcanized rubber of the following properties was produced:

| Time of cure | Stretch | Load at 600% elong. | Tensile |
|---|---|---|---|
| 15 minutes | 661% | 3200 lbs./in². | 4495 lbs./in². |
| 30 minutes | 685% | 2800 lbs. | 4458 lbs./in². |
| 60 minutes | 650% | 2900 lbs. | 4307 lbs./in². |

*Example III*

Isopropyl monoxanthogen was used with aniline in the formula:

100 parts by weight rubber
5 parts by weight sulphur
5 parts by weight zinc oxide
0.5 parts by weight monosulfide
1.0 part by weight aniline When milled and then cured at the temperature of 10 pound steam the product showed the following properties:

| Time of cure | Stretch | Set | Load at 600% elong. | Tensile |
|---|---|---|---|---|
| 15 minutes | 850% | 10 | 800 lbs./in². | 3448 lbs./in². |
| 30 minutes | 850% | 15 | 850 lbs. | 3232 lbs./in². |
| 60 minutes | 860% | 13 | 900 lbs. | 3293 lbs./in². |

I do not wish my invention to be limited to the above examples, since other combinations and conditions may be used in accordance with the description of my invention.

Claims:

1. A process of treating rubber or similar material which comprises incorporating with the unvulcanized rubber compound a vulcanizing agent and isopropyl monoxanthogen and vulcanizing the rubber.

2. A process of treating rubber or similar material which comprises incorporating with the unvulcanized rubber compound a vulcanizing agent and the reaction product of isopropyl dixanthogen and an alkali metal cyanide, and vulcanizing the rubber.

3. The process of accelerating the vulcanization of rubber comprising vulcanizing the same in the presence of isopropyl monoxanthogen.

4. The process of accelerating the vulcanization of rubber comprising vulcanizing the same in the presence of the reaction product of isopropyl dixanthogen and an alkali metal cyanide.

5. A vulcanized rubber derived from rubber or similar material incorporated with a vulcanizing agent and isopropyl monoxanthogen.

6. A vulcanized rubber derived from rubber or similar material incorporated with a vulcanizing agent, an amine, and isopropyl monoxanthogen.

7. A vulcanized rubber derived from rubber or similar material incorporated with a vulcanizing agent, an aromatic amine and isopropyl monoxanthogen.

8. A vulcanized rubber derived from rubber or similar material incorporated with a vulcanizing agent, aniline, and isopropyl monoxanthogen.

9. A vulcanized rubber derived from rubber or similar material incorporated with a vulcanizing agent and the reaction product of isopropyl dixanthogen and an alkali metal cyanide.

Signed at Perth Amboy, in the county of Middlesex and State of New Jersey, this fifteenth day of May, A. D. 1928.

GEORGE STAFFORD WHITBY.

CERTIFICATE OF CORRECTION.

Patent No. 1,735,701.      Granted November 12, 1929, to

GEORGE STAFFORD WHITBY.

It is hereby certified that error appears in the printed specification of the above numbered patent requiring correction as follows: Page 1, line 86, for the word "methyl" read "menthyl"; and that the said Letters Patent should be read with this correction therein that the same may conform to the record of the case in the Patent Office.

Signed and sealed this 31st day of December, A. D. 1929.

(Seal)

M. J. Moore,
Acting Commissioner of Patents.

ber or similar material incorporated with a vulcanizing agent, aniline, and isopropyl monoxanthogen.

9. A vulcanized rubber derived from rubber or similar material incorporated with a vulcanizing agent and the reaction product of isopropyl dixanthogen and an alkali metal cyanide.

Signed at Perth Amboy, in the county of Middlesex and State of New Jersey, this fifteenth day of May, A. D. 1928.

GEORGE STAFFORD WHITBY.

CERTIFICATE OF CORRECTION.

Patent No. 1,735,701.   Granted November 12, 1929, to

GEORGE STAFFORD WHITBY.

It is hereby certified that error appears in the printed specification of the above numbered patent requiring correction as follows: Page 1, line 86, for the word "methyl" read "menthyl"; and that the said Letters Patent should be read with this correction therein that the same may conform to the record of the case in the Patent Office.

Signed and sealed this 31st day of December, A. D. 1929.

(Seal)

M. J. Moore,
Acting Commissioner of Patents.